(12) United States Patent
Ruprecht et al.

(10) Patent No.: US 9,744,900 B2
(45) Date of Patent: Aug. 29, 2017

(54) LIGHTING DEVICE FOR A MOTOR VEHICLE

(71) Applicant: ZIZALA LICHTSYSTEME GMBH, Wieselburg (AT)

(72) Inventors: Georg Ruprecht, Hofamt Priel (AT); Irmgard Krenn, Purgstall/Erlauf (AT); Clemens Hauer, Steinakirchen am Forst (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 542 days.

(21) Appl. No.: 14/354,094

(22) PCT Filed: Jan. 17, 2013

(86) PCT No.: PCT/AT2013/050015
§ 371 (c)(1),
(2) Date: Apr. 24, 2014

(87) PCT Pub. No.: WO2013/123537
PCT Pub. Date: Aug. 29, 2013

(65) Prior Publication Data
US 2014/0268843 A1  Sep. 18, 2014

(30) Foreign Application Priority Data

Feb. 24, 2012  (AT) .............................. A 50042/2012

(51) Int. Cl.
*B60Q 1/068*  (2006.01)

(52) U.S. Cl.
CPC ........... *B60Q 1/068* (2013.01); *B60Q 1/0683* (2013.01); *B60Q 2200/32* (2013.01); *B60Q 2200/36* (2013.01)

(58) Field of Classification Search
CPC .. B60Q 1/068; B60Q 1/0683; B60Q 2200/36; B60Q 2200/32
See application file for complete search history.

(56) References Cited

U.S. PATENT DOCUMENTS 3,710,097 A    1/1973  Bright et al.
5,016,155 A *  5/1991  Chevance ............ B60Q 1/0041
                                              362/233

(Continued)

FOREIGN PATENT DOCUMENTS

DE    102006018963 A1    10/2007
EP       1270322 A1     1/2003

(Continued)

OTHER PUBLICATIONS

International Preliminary Report on Patentability—PCT/AT2013/050015, dated Feb. 24, 2012.

*Primary Examiner* — Stephen F Husar
(74) *Attorney, Agent, or Firm* — Eversheds Sutherland (US) LLP

(57) ABSTRACT

The invention relates to an illuminating device (1) for a motor vehicle, comprising two or more light modules (2), which light modules (2) are provided to generate a common light distribution, and a common supporting body (3), on which the at least two light modules (2) are fastened, wherein at least one of the light modules (2) is mounted on the supporting body (3) so as to be pivotable about at least one axis (H, V) with respect to the supporting body (3), and wherein the at least one pivotable light module (2) is mounted on the supporting body (3) in an articulated manner by means of an articulation (4) so as to be pivotable about the at least one axis (V, H), wherein at least one prestressing device (5) is also provided, by means of which the at least one adjustable light module (2) is held in a prestressed (Continued)

Figure 1:
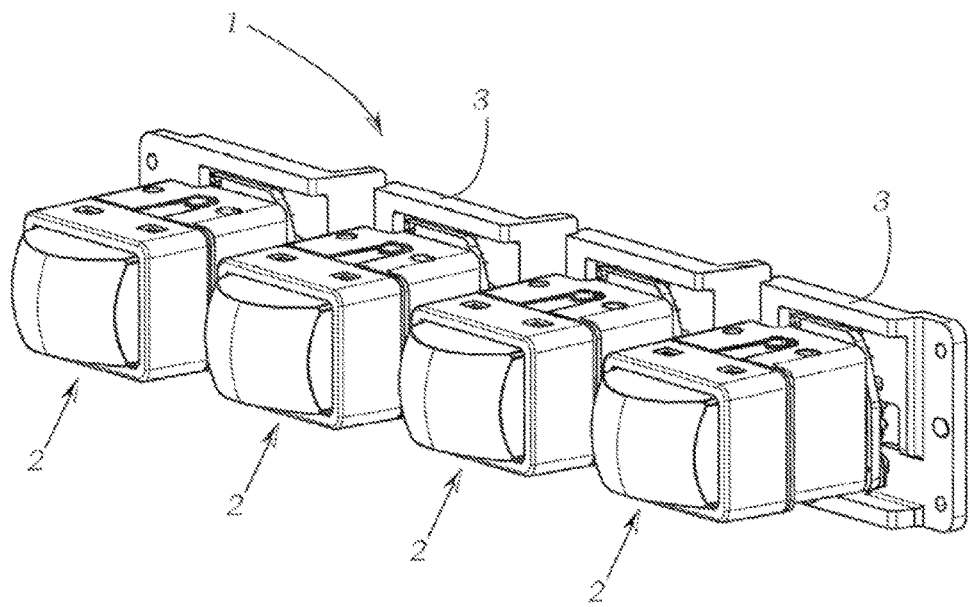

manner on the supporting body (3) pivotably about the articulation (4).

19 Claims, 3 Drawing Sheets

(56) References Cited

U.S. PATENT DOCUMENTS

| | | | |
|---|---|---|---|
| 2008/0266890 A1* | 10/2008 | Mochizuki | B60Q 1/076 362/524 |
| 2009/0207626 A1 | 8/2009 | Kim | |
| 2013/0114277 A1 | 5/2013 | Faffelberger | |
| 2013/0215632 A1 | 8/2013 | Jackl | |
| 2013/0223089 A1 | 8/2013 | Danner et al. | |
| 2013/0235605 A1 | 9/2013 | Bohm | |
| 2013/0308329 A1 | 11/2013 | Danner et al. | |
| 2014/0043843 A1 | 2/2014 | Moser et al. | |

FOREIGN PATENT DOCUMENTS

| | | | |
|---|---|---|---|
| FR | 2056434 A5 | 5/1971 | |
| FR | 2351350 A1 | 12/1977 | |
| FR | 2800336 A1 | 5/2001 | |
| GB | 1432828 A | 4/1976 | |
| JP | S59195441 A | 11/1984 | |

* cited by examiner

LIGHTING DEVICE FOR A MOTOR VEHICLE

The invention relates to an illuminating device for a motor vehicle, comprising two or more light modules, which light modules are provided to generate a common light distribution.

The invention also relates to a vehicle headlight for a motor vehicle comprising at least one such illuminating device.

In order to generate an optimal and in particular legally compliant light exposure, it is necessary to be able to adjust the individual light modules relative to one another. Complex solutions are known for this purpose from the prior art, which presents adjustment systems having complex mountings and complex slide guides with ball joint connections for adjusting screws, etc.

The object of the invention is to create an illuminating device which allows the light modules to be easily adjusted relative to one another.

This object is achieved with an illuminating device of the type mentioned in the introduction in that, in accordance with the invention, a common supporting body is provided, on which the at least two light modules are fastened, wherein at least one of the light modules is mounted on the supporting body so as to be pivotable about at least one axis with respect to the supporting body, and wherein the at least one pivotable light module is mounted on the supporting body in an articulated manner by means of an articulation so as to be pivotable about the at least one axis, wherein at least one prestressing device is also provided, by means of which the at least one adjustable light module is held in a prestressed manner on the supporting body pivotably about the articulation, and wherein at least one adjusting device is also provided, which is preferably mounted on the supporting body and which at least one adjusting device acts on the at least one adjustable light module, and wherein, as a result of an adjustment of the at least one adjusting device, the at least one adjustable light module is displaced, at the point of action of the at least one adjusting device, substantially in or against the direction of a prestress, and therefore the light module pivots about the connection line running through the articulation and arranged normal to the connection line between the articulation and the adjusting device.

The light module is mounted pivotably via the articulation, the light module is fixed on the one hand by means of the prestressing device, and on the other hand the light module remains movable to a certain extent. Due to the at least one adjusting device, the light module can be displaced quasi linearly at the point of action of the adjusting device, wither against the restoring force of the prestressing device by means of the adjusting device, or, if the adjusting device "releases" the light module, the light module is moved over this released path by the restoring force of the prestressing device.

A much simpler solution compared to the known systems described in the introduction from the prior art for adjusting light modules is therefore presented with the invention.

In order to ensure an optimal adjustability of the at least one adjustable light module, the at least one light module is preferably mounted pivotably about two axes.

Irrespective of whether one or preferably two axes are provided, these run through the articulation in any case.

Here, it is favourable if the two axes are normal to one another.

In order to allow independent adjustability, a second adjusting device is provided, by means of which the light module is pivotable about the second axis.

In accordance with legal requirements, light exposures must be adjustable vertically and/or in the horizontal direction. Accordingly, an axis runs horizontally in the installed position of the lighting device, and therefore the light exposure of the corresponding light module can be adjusted in the vertical direction, and/or an axis runs vertically in the installed position of the lighting device, and therefore the light exposure can be adjusted in the horizontal direction.

The articulation is advantageously formed as a ball joint, and therefore a free pivotability of the light module at least about the two pivot axes is possible.

In a specific embodiment of the lighting device the at least one adjusting device is formed as a screw which is mounted rotatably in the supporting body and acts with a stop region on a stop face of the associated light module.

Further, an adjusting device for pivoting the light module about a pivot axis at a defined normal distance from said pivot axis is provided and preferably lies substantially on an axis normal to the pivot axis and running through the articulation.

Here, care is preferably taken to ensure that the respective adjusting device is arranged away from the articulation where possible, since relatively large linear movements of the light module are then necessary in order to produce a small pivot movement. The pivot movement can thus be adjusted very finely and precisely.

It has specifically proven to be expedient if the two adjusting devices and the articulation basically form the corners of a quadrilateral and the prestressing device is preferably arranged in the fourth corner.

The prestressing device therefore lies substantially on a diagonal of the rectangle.

Further, in a specific embodiment of the invention, the prestressing device consists of a screw which is mounted rotatably on the light module, wherein the screw is passed through a bore in the supporting frame, preferably through a bushing which is arranged in the bore in the supporting frame, and wherein the prestressing device further comprises a spring which is fixed between the supporting frame and a screw head of the screw and is tensioned as the screw is tightened.

At least two light modules, preferably a plurality of light modules, for example three, four, five or more light modules, are typically provided on a supporting body. With n light modules, n being an integer and n>1 (that is to say n=2, 3, 4, 5, . . . ), at least (n−1) light modules are pivotable here about at least one axis, preferably both axes, in order to ensure an optimal adjustability of the individual light modules relative to one another. It is particularly advantageous here if all n light modules are actually pivotable about the at least one axis, preferably about both axes.

Figure 2:
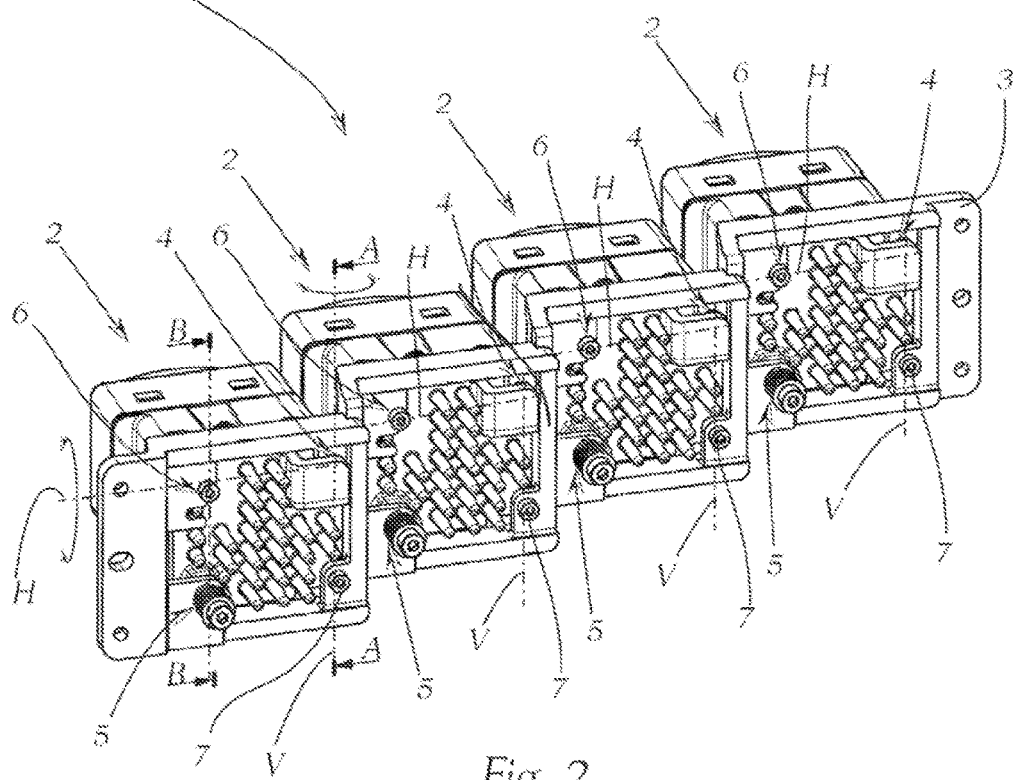
Figure 3:
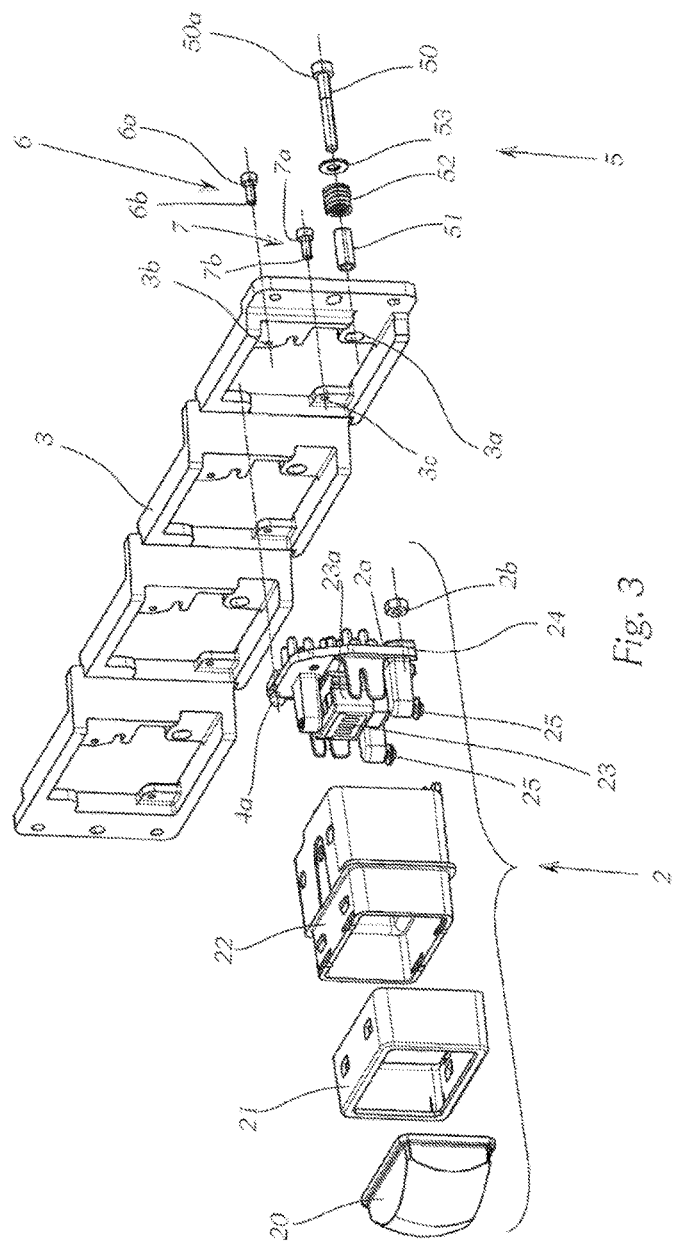
Figure 4:
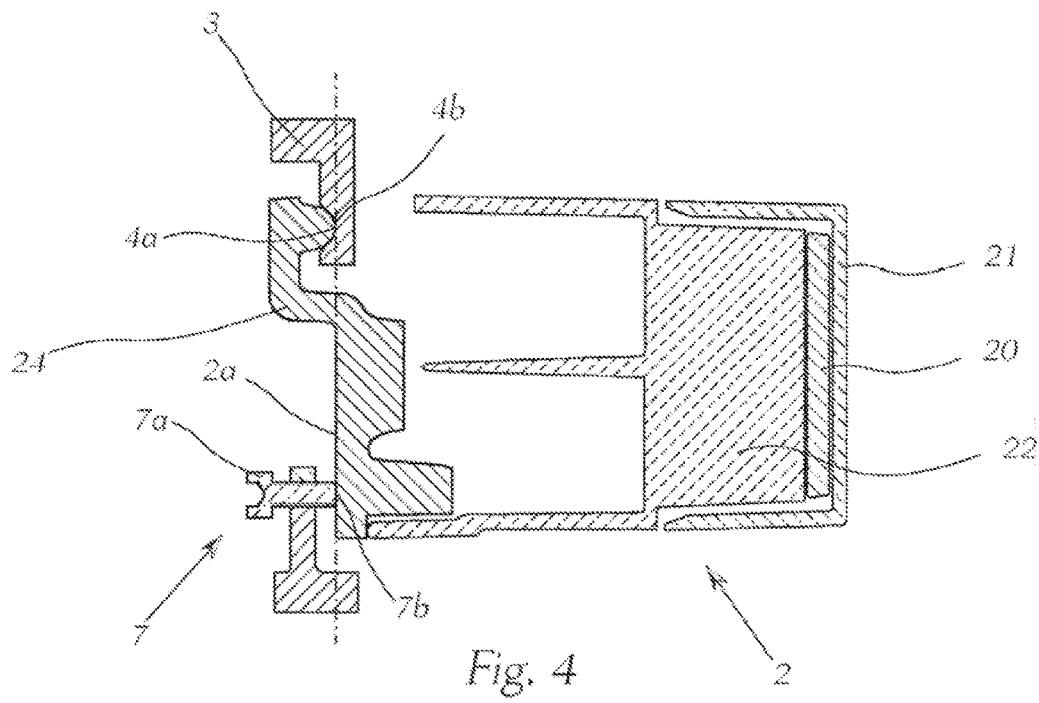
Figure 5:
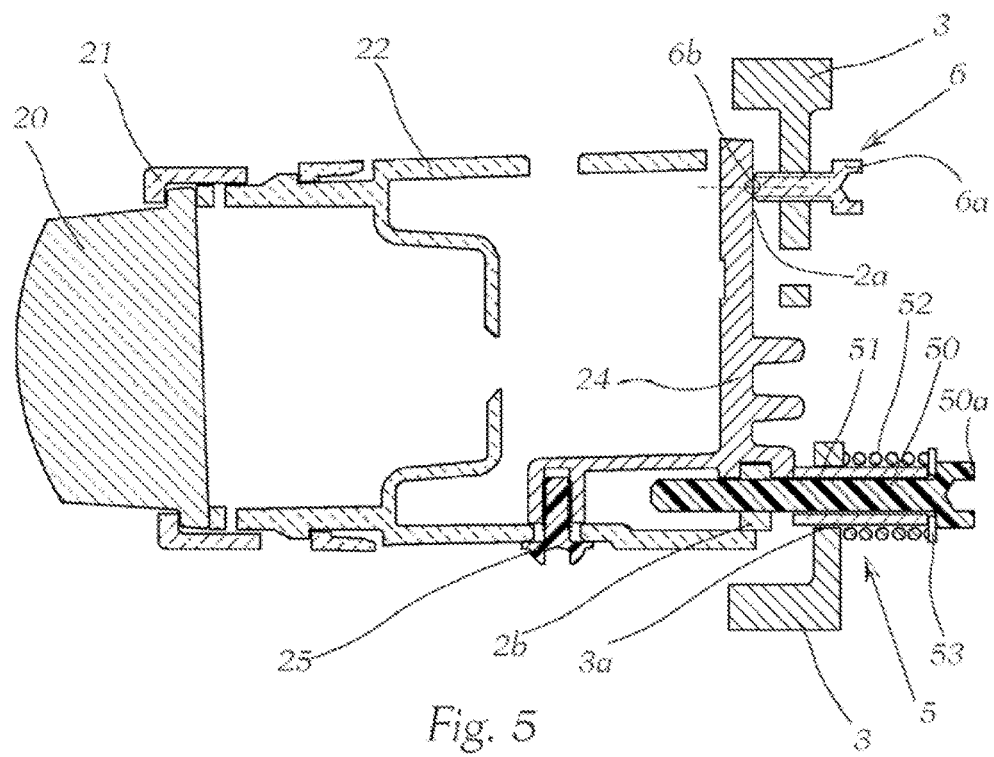

The invention will be explained in greater detail hereinafter with reference to the drawing, in which FIG. 1 shows a perspective view from the front of an illuminating device according to the invention, FIG. 2 shows a perspective view from behind of the illuminating device from FIG. 1, FIG. 3 shows an exploded illustration of the illuminating device from FIGS. 1 and 2, FIG. 4 shows a section through the illuminating device along the line A-A from FIG. 2, and FIG. 5 shows a section through the illuminating device along the line B-B from FIG. 2.

FIG. 1 shows an illuminating device 1 with four light modules 2, which are fastened on a common supporting body 3 or supporting frame. In the shown embodiment the individual portions of the supporting body 3 are offset rearwardly in relation to one another in a stepped manner in the horizontal direction, with a corresponding offset of the light modules 2. The supporting body may also have a different form, for example it may also be continuously level.

Each of the light modules 2 is mounted on the supporting body 3 so as to be pivotable about a horizontal axis H, and therefore the light exposure of the light module 2 can be adjusted in the vertical direction. Further, each light module 2 is mounted on the supporting body 3 so as to be pivotable about a vertical axis V, and therefore the light exposure can also be adjusted in the horizontal direction. Together, all light modules 2 together generate a common light exposure.

For example, a left vehicle headlight comprises an illuminating device 1. The right headlight comprises a lighting device that is comparable in terms of the basic structure. Together, the two headlights generate a desired light exposure, for example a main beam or dipped headlight beam, wherein the light distribution can preferably be connected in segments in accordance with the individual light modules.

In particular in the case of a dipped headlight beam, it is also conceivable for the left and right headlights to form a complete dipped headlight beam distribution. In the case of a partial main beam, the left headlight may generate the left part of the light exposure and the right headlight may generate the right part of the light exposure for example, the two light exposures then together creating a full main beam.

In principle, the invention is not limited to a specific light distribution, but, due to the specific structure with individual light modules which can be operated independently of one another, is particularly well suited for the generation of segmented light distributions, as already mentioned above. In the case of such light distributions, the overall light distribution is composed of individual light segments, which are generated by the individual light modules. By switching on and switching off specific segments selectively, desired areas on the road can be illuminated or remain unilluminated selectively.

A shown arrangement is suitable in particular for the generation of a segmented main beam.

In any case, light distributions which comply with the legal standards, such as SAE, CCC or ECE, can be generated with an illuminating device according to the invention or with one (or two) corresponding headlights.

The two pivot axes H, V are illustrated in FIG. 2 for the individual light modules.

For pivoting, a light module 2 is mounted pivotably on the supporting body 3 by means of an articulation 4, the two axes H, V running through this articulation 4 and being arranged normal to one another.

FIG. 2 further shows a prestressing device 5, by means of which a light module 2 can be held in a prestressed manner on the supporting body 3 pivotably about the articulation 4.

For the pivoting movement itself, two adjusting devices 6, 7 are mounted on the supporting body 3 and act on the light module 2, more specifically on the rear face of the light module facing the supporting body 3. The light module 2 is pivoted about the vertical axis V by means of the upper adjusting device 6, and the light module 2 is pivoted about the horizontal axis H by means of the lower adjusting device 7.

The operating principle will be explained in greater detail hereinafter with reference to FIGS. 3 to 5, in which the connections can be better seen.

Firstly, it must be mentioned that the actual embodiment of the individual light modules 2 is of secondary importance for the invention. In the shown embodiment a light module 2 consists of a lens 20 (secondary optics), via which light from a light source (not illustrated) is imaged in an area in front of the illuminating device 1. For this purpose, the light of the light source is coupled into a primary optics 23, light then exits from the primary optics 23 and is imaged via the lens 20.

On the rear face, the light module 2 has a heat sink 24, on which the carrier board for the light source 6 sits, the primary optics 23 being connected to the heat sink 24 (or to the carrier board) via a holder 23a.

The lens 20 is attached by means of an aperture 21 to a lens holder 20, said lens holder 22 in turn being fastened to the heat sink, for example via corresponding screws 25 as illustrated. The aperture 21 serves primarily to fasten the lens 20 to the lens holder 22, but at the same time, due to its shaping, also prevents the light from irradiating in undesired directions.

The articulation 4 consists of a ball, in particular a hemisphere or partial sphere 4a, which is attached to the heat sink 24, and a corresponding indentation or ball socket 4b on the supporting frame 3 (see FIG. 4 in particular), in which the ball 4a is rotatably mounted.

The supporting frame 3 and light module 2 or the heat sink 24 are held together by means of the prestressing device 5, that is to say the ball 4a is pressed into the socket 4b.

In the shown embodiment of the invention the prestressing device 5, see FIGS. 3 and 4 in particular, consists of a screw 50, which is mounted rotatably on the light module 2, that is to say on the heat sink 24. To this end, a nut 2b with an inner thread is attached fixedly in the heat sink 24 for example, the screw 50, which in turn has a corresponding mating thread, being mounted rotatably in said nut. The thread could also be attached directly in the heat sink 24 however, and in this case the nut 2b can be omitted.

The screw 50 is guided through a bushing 51, which is in turn arranged in a bore 3a in the supporting frame 3.

Here, the bushing 51 presses via one of its ends against the heat sink 24 and via its other end against the screw head 50a (or the washer 53). Instead of the use of a bushing 51, a stepped screw may also be used, which performs the same function (prestressing of the spring, stop on the heat sink 24).

A spring 52, here in the form of a coil spring, is arranged around the bushing 51 and is fixed between the screw head 50a and the supporting frame 3. Since the screw head 50a usually has a smaller diameter than the spring 52, a washer 53 is provided between the screw head 50a and the spring 52. The screw could of course also have an accordingly enlarged screw head, or a shoulder is provided on the screw and for example is formed in one piece therewith, the spring being fixed to said collar.

As the screw 50 is tightened, the spring 52, which is a compression spring in this embodiment, is tensioned between the screw head 50a and the supporting frame 3 and the heat sink 24 and supporting frame 3 are thus held against one another, wherein the heat sink 24 remains pivotable however with respect to the supporting frame 3 under the action of a corresponding force. Due to the prestressing of the spring 52, the spring force can act in both directions.

The light module 2 is mounted pivotably via the articulation 4a, 4b, the light module 2 being fixed on the one hand by means of the prestressing device 5, and the light module 2 remaining movable to a small extent on the other hand. Due to the two adjusting devices 6, 7, the light module 2 can be displaced quasi linearly (in actual fact it is a pivoting movement about the articulation 4) at the point of action of the adjusting devices 6, 7 on the heat sink, either against the restoring force of the prestressing device 5 (exerted by the spring 52) by means of the adjusting device 6, 7, or, if the adjusting device "releases" the light module, the light module is moved over this released path by the restoring force of the prestressing device.

If FIG. 5 is considered for example and if the adjusting device 6 is moved to the left, that is to say the adjusting device is pressed against the heat sink 24, the heat sink 24 and accordingly the light module 2 are then pivoted about the vertical axis V. In addition, the screw 50 is likewise moved to the left with respect to the stationary supporting body 3, that is to say in the direction of the movement of the heat sink 24. The bushing 51 is displaced accordingly in the bore 3*a* in the supporting body 3, likewise to the left. The spring 52 is tensioned further.

If the adjusting device 6 is now moved again in the other direction, that is to say to the right in FIG. 5, the adjusting device 6 does not entrain the heat sink 24, since these are not fixedly interconnected. The spring 52 can now relax accordingly however, and therefore the heat sink 24 is entrained back again accordingly with the adjusting device 6.

The same considerations apply to the adjusting device 7.

As can be inferred from FIGS. 3-5, the two adjusting devices 6, 7 are preferably formed as screws 6*a*, 7*a*, which are mounted rotatably in the supporting body 3 in corresponding bores 3*b*, 3*c*. The screws 6*a*, 7*a* for this purpose have a thread, via which they are mounted in a corresponding mating thread in the bores 3*b*, 3*c*. As the screws 6*a*, 7*a* are rotated, they then move accordingly in the axial direction to the front (in the direction of the light module) or to the rear (away therefrom).

The primary purpose of an adjusting device 6, 7 is to be able to bring the heat sink into a certain position, against which the heat sink (or generally speaking the light module) then rests. To this end, an adjusting device therefore has to be movable back and forth in a straight line and must be fixable in the desired position. In the simplest case, this can be implemented, as described in the figures, by producing an adjusting device in the form of a screw, although other embodiments that are generally more technically complex however and more difficult to operate (for example displaceable pins with locking means) are of course also conceivable.

The screws 6*a*, 7*a* rest via a preferably planar stop region 6*b*, 7*b* (end faces 6*b*, 7*b* of the screws) against a stop face 2*a* of the light module 2. Here, the stop face 2*a* is formed by the side of the heat sink 24 facing the screws.

As the screw 6*a* is rotated, the light module 2 is pivoted horizontally about the vertical axis V, wherein this axis V is formed by the ball joint 4 and the stop region 7*b* of the screw 7*a* resting against the heat sink 24.

As the screw 7*a* is rotated, the light module 2 is pivoted vertically about the horizontal axis H, wherein this axis H is formed by the ball joint 4 and the stop region 6*b* of the screw 6*a* resting against the heat sink 24.

The invention claimed is:

1. An illuminating device (1) for a motor vehicle, comprising:
   two or more light modules (2) that are independently operable to generate a common light distribution;
   a common supporting body (3), wherein the two or more light modules (2) are fastened directly to the common supporting body (3), wherein at least one of the two or more light modules (2) is pivotally mounted on the common supporting body (3) about at least one axis (H, V) with respect to the common supporting body (3);
   an articulation (4) for mounting the at least one light module (2) of the two or more light modules on the common supporting body (3) in an articulated manner so as to be pivotable about the at least one axis (V, H);
   at least one prestressing device (5) that places a prestress on and holds the at least one light module (2) of the two or more light modules on the common supporting body (3) pivotally about the articulation (4);
   at least one adjusting device (6, 7) which acts on the at least one light module (2) of the two or more light modules, wherein an adjustment of the at least one adjusting device (6, 7) displaces the at least one light module (2) of the two or more light modules at a point of action of the at least one adjusting device (6, 7) substantially against a direction of the prestress or in a direction of the presstress when the at least one adjusting device is released and therefore the at least one light module (2) of the two or more light modules is pivoted about a connection line (V, H) running through the articulation (4) and arranged normal to the connection line between the articulation (4) and the at least one adjusting device (6, 7);
   wherein each of the two or more light modules (2) has a heat sink (24);
   wherein the articulation (4) consists of a ball (4*a*) and an indentation or ball socket (4*b*) in which the ball (4*a*) is rotatably mounted, wherein the ball (4*a*) is attached to the heat sink (24), wherein the indentation or ball socket (4*b*) is disposed on the common supporting body (3);
   wherein the at least one prestressing device holds together the common supporting body (3) and the heat sink (24), wherein the at least one prestressing device (5) consists of a screw (50) and a spring (52), wherein the screw (5) is mounted rotatably on the at least one light module (2) of the two or more light modules;
   wherein the screw (50) has a mating thread that engages with a thread directly in the heat sink (24) or in an inner thread of a nut (2*b*) that is arranged fixedly in the heat sink (24);
   wherein the screw (50) is passed through a bore (3*a*) in the common supporting body (3), wherein either:
   the screw (50) is passed through a bushing (51) that is arranged in the bore (3*a*) in the common supporting body (3), or
   the screw (50) is formed as a stepped screw, and therefore the screw (50) is supported on the heat sink (24); and
   wherein the spring (52) is fixed between the common supporting body (3) and a screw head (50*a*) of the screw (50) and is tensioned as the screw (50) is tightened, and therefore the ball (4*a*) is pressed into the indentation or socket (4*b*).

2. The illuminating device according to claim 1, wherein the at least one light module (2) of the two or more light modules is mounted pivotably about two axes (V, H).

3. The illuminating device according to claim 2, wherein the two axes (V, H) are arranged normal to one another.

4. The illuminating device according to claim 2 wherein a second adjusting device (6, 7) is provided, by means of which the at least one light module (2) of the two or more light modules is pivotable about the second axis (V, H).

5. The illuminating device according to claim 1, wherein an axis (H) runs horizontally in the installed position of the illuminating device (1).

6. The illuminating device according to claim 1, wherein an axis (V) runs vertically in the installed position of the illuminating device (1).

7. The illuminating device according to claim 1, wherein the articulation (4) is a ball joint.

8. The illuminating device according to claim 1, wherein the at least one adjusting device (6, 7) is formed as a screw (6a, 7a) which is mounted rotatably in the common supporting body (3) and acts via a stop region (6b, 7b) on a stop face (2a) of the at least one light module (2) of the two or more light modules.

9. The illuminating device according to claim 1, wherein the least one adjusting device (6, 7) for pivoting the at least one light module (2) of the two or more light modules about a pivot axis (H, V) is arranged at a defined normal distance from said pivot axis (H, V).

10. The illuminating device according to claim 1, wherein with n light modules (2) of the two or more light modules, n being an integer and n>1, at least (n−1) light modules (2) of the two or more light modules are pivotable about at least one axis.

11. A vehicle headlight comprising at least one illuminating device according to claim 1.

12. The illuminating device according to claim 1, wherein the at least one adjusting device (6, 7) is mounted on the common supporting body (3).

13. The illuminating device according to claim 1, wherein the ball (4a) is a hemisphere or a partial sphere.

14. The illuminating device according to claim 4, wherein the least one adjusting device (6, 7) comprises two adjusting devices (6, 7), and wherein the two adjusting devices (6, 7), the at least one prestressing device (5), and the articulation (4) form a quadrilateral.

15. The illuminating device according to claim 14, wherein the at least one prestressing device (5) is arranged in a fourth corner of the quadrilateral.

16. The illuminating device according to claim 9, wherein the at least one adjusting device (6, 7) lies substantially on an axis (V, H) normal to the pivot axis (H, V) and running through the articulation (4).

17. The illuminating device according to claim 10, wherein the at least (n−1) light modules (2) of the two or more light modules are pivotable about two axes (6, 7) of the at least one axis (H, V).

18. The illuminating device according to claim 10, wherein all n light modules of the two or more light modules are pivotable about the at least one axis.

19. The illuminating device according to claim 18, wherein all n light modules of the two or more light modules are pivotable about two axes (6, 7) of the at least one axis (H, V).

* * * * *